United States Patent [19]
Schneider et al.

[11] Patent Number: 6,040,410
[45] Date of Patent: Mar. 21, 2000

[54] PROCESS FOR ALTERING THE VISCOSITY OF ORGANOPOLYSILOXANES

[75] Inventors: Otto Schneider, Burghausen; Ralf Kratschmera, Burgkirchen, both of Germany

[73] Assignee: Wacker-Chemie GmbH, Munich, Germany

[21] Appl. No.: 09/189,554

[22] Filed: Nov. 11, 1998

[30] Foreign Application Priority Data

Dec. 19, 1997 [DE] Germany .................. 197 56 832

[51] Int. Cl.[7] .................................................. C08G 77/08
[52] U.S. Cl. .................................................. 528/14
[58] Field of Search .................................... 528/14

[56] References Cited

U.S. PATENT DOCUMENTS

| | | | |
|---|---|---|---|
| 2,460,805 | 2/1949 | Britton et al. | 528/16 |
| 2,866,760 | 12/1958 | Haessler et al. | 252/383 |
| 3,903,047 | 9/1975 | Ashby | 528/12 |
| 4,792,596 | 12/1988 | Ottlinger et al. | 528/14 |
| 5,723,561 | 3/1998 | Braun et al. | 528/12 |

FOREIGN PATENT DOCUMENTS

| | | |
|---|---|---|
| 1278251 | 10/1961 | France . |
| 44 24 001 | 1/1995 | Germany . |
| 44 41 057 A1 | 5/1996 | Germany . |

OTHER PUBLICATIONS

D. Tilak B. Tennakoon et al, "Characterization of Clays and Clay–Organic Systems", J. Chem. Soc., Faraday Trans. 1, 1986, 82, 545–562.

Chemical Abstracts, vol. 79: 83827e, 1973, Kolloid. Zh. 1973, Bd. 35, H. 3, sides 467–75,; FR 278,251, the preparation of polysiloxanes in presence of zeolites as catalysts is disclosed.

Derwent Abstract Corresponding to DE 44 24 001 A1, AN 96–107800.

*Primary Examiner*—Robert Dawson
*Assistant Examiner*—Kuo-Liang Peng
*Attorney, Agent, or Firm*—Brooks & Kushman P.C.

[57] ABSTRACT

The invention relates to a process for altering the viscosity of organopolysiloxanes, wherein clay which has been treated with mineral acid and subsequently heated to from 250° C. to 1200° C. is used as catalyst. In the process, only small amounts of volatile siloxanes, in particular only small amounts of cyclic molecules, are formed.

15 Claims, No Drawings

PROCESS FOR ALTERING THE VISCOSITY OF ORGANOPOLYSILOXANES

TECHNICAL FIELD

The invention relates to a process for altering the viscosity of organopolysiloxanes employing activated clay, wherein only small amounts of volatile siloxanes, in particular only small amounts of cyclic molecules, are formed.

BACKGROUND ART

Processes for altering the viscosity of organopolysiloxanes are known. The condensation and equilibration reactions required for this purpose frequently proceed simultaneously.

Phosphonitrilic halides are frequently used as homogeneous catalysts when the formation of cyclic molecules is undesirable. However, these catalysts cannot be removed from the product using physical methods. They are neutralized, and the neutralization products remain in the product.

Heterogeneous catalysts have the advantage that they can easily be removed from the organopolysiloxanes formed. In DE-A44 41 057, for example, acid-activated bleaching earth is used in a heterogeneous mixture as catalyst for continuously preparing organopolysiloxanes by condensation and/or equilibration reactions. In US-A4,792,596, acid-activated montmorillonite is used for this purpose in the form of a fixed-bed catalyst. In the latter process, the catalyst does not have to be removed by specific process steps such as filtration. However, high proportions of from about 10% to 16% of volatile siloxanes, in particular cyclic molecules, are formed in both processes.

DISCLOSURE OF INVENTION

It is an object of the present invention to provide a heterogeneously catalyzed process for altering the viscosity of organopolysiloxanes, wherein only small amounts of volatile siloxanes/cyclic molecules are obtained.

BEST MODE FOR CARRYING OUT THE INVENTION

The invention provides a process for altering the viscosity of organopolysiloxanes, wherein clay which has been treated with mineral acid and subsequently heated to from 250° C. to 1200° C. is used as catalyst.

The proportion of volatile siloxanes, in particular cyclic molecules, in the product is significantly lower than when using customary heterogeneous catalysts, particularly if these have not been heated. This increases the yield of linear organopolysiloxanes. Furthermore, the amounts of volatile cyclic molecules which have to be separated from the product and returned to the process are not as great. This leads to a reduced outlay and to better space-time yields of the manufacturing plant.

The clays which can be used as catalysts are sheet silicates derived as weathering products of rocks containing aluminum oxide. They consist mainly of $Al_2O_3$, $SiO_2$ and $H_2O$ and sometimes smaller proportions of $Fe^{III}$, Ca, Mg, Na and K. Examples of suitable clays are kaolin such as kaolinite, allophane and haloysite; illites such as glauconite; smectites such as montmorillonite, bentonite, nontronite and beidellite; chlorites and vermiculites.

The clays are treated with mineral acids, in particular hydrochloric acid or sulfuric acid or else phosphoric acid, usually at from 80° C. to 170° C. Such acid-treated clays are marketed, for example, under the name Tonsil® (Süd-Chemie AG, Munich) and Filtrol® by Engelhard (USA).

The acid-activated clays are subsequently heated to from 250° C. to 1200° C., preferably at least 350° C., and in particular at least 450° C. The heating can be carried out in the presence or absence of oxygen. When oxygen is present, the heating can be carried out in pure oxygen, or in oxygen diluted with inert gas, e.g. air. Preferably, at least 10% by volume of oxygen is present. Heating is preferably carried out for at least 10 minutes, in particular at least 50 minutes. The pressure is preferably at least 100 hPa.

Preferably, the clays are used as catalysts for altering the viscosity of organopolysiloxanes in amounts of from 0.01 to 15% by weight, preferably at least 0.03% by weight, in particular at least 0.1% by weight and preferably not more than 8% by weight, in particular not more than 5% by weight, in each case based on the weight of the organopolysiloxanes used.

In the process, it is possible to use freshly prepared catalyst, stored catalyst or catalyst which has already been used a plurality of times.

The change in the viscosity of organopolysiloxanes occurs as a result of condensation and equilibration reactions. Condensation reactions of organosilicon compounds are, in particular, the reaction of two 2 Si-bonded hydroxyl groups with elimination of water, also, for example, the reaction of an Si-bonded hydroxyl group with an Si-bonded alkoxy group with elimination of alcohol or with Si-bonded halogen with elimination of hydrogen halide.

For the purposes of the present invention, equilibration reactions are the rearrangements of siloxane bonds of siloxane units. The viscosity of organopolysiloxanes can be reduced or preferably increased. It is possible to prepare all organopolysiloxanes which have previously been prepared by condensation and equilibration reactions using solid catalysts. For the purposes of the present invention, the term "organopolysiloxanes" includes oligomeric and dimeric siloxanes.

The organopolysiloxanes used are preferably linear or essentially linear diorganopolysiloxanes having Si-bonded hydroxyl groups and/or diorganopolysiloxanes whose ends are blocked by triorganosiloxy groups, possibly in admixture with cyclic diorganopolysiloxanes.

The essentially linear diorganopolysiloxanes contain at least 80 mol %, preferably 90 mol %, in particular 95 mol %, of $R_2SiO$ units, where R is as defined below.

It is also possible to use organopolysiloxanes in which, for example, up to 20 mol %, in particular up to 10 mol % of the diorganosiloxane units are replaced by other siloxane units such as $RSiO_{3/2}$ and/or $SiO_{4/2}$ units, where R is as defined below.

Organopolysiloxanes which can be used in the process are generally known, and are frequently represented by the formulae $$X(SiR_2O)_n SiR_2X \qquad (I),$$

$$(SiR_2O)_m \qquad (II)$$

and $$R_3SiOSiR_3 \qquad (III)$$

where

R is a monovalent, unsubstituted or halogen- or cyano-substituted hydrocarbon radical, X is a hydroxyl group, an alkoxy group, chlorine or the group —OSiR$_3$, where R is as defined above, n is 0 or an integer from 1 to 200, preferably 0 or an average number from 1 to 150, and m is an integer from 3 to 60, preferably from 3 to 20.

Although not shown by the formulae frequently used, and as discussed previously, up to 20 mol %, in particular up to 10 mol %, of the diorganosiloxane units can be replaced by other siloxane units such as RSiO$_{3/2}$ and/or SiO$_{4/2}$ units, where R is as defined above.

The radical R is preferably a hydrocarbon radical having from 1 to 18 carbon atoms, particularly preferably a hydrocarbon radical having from 1 to 4 carbon atoms, in particular the methyl radical.

Examples of monovalent hydrocarbon radicals R are alkyl radicals such as the methyl, ethyl, n-propyl, iso-propyl, n-butyl and sec-butyl radicals, alkenyl radicals such as the vinyl and allyl radicals, and aryl radicals such as the phenyl and naphthyl radicals.

Examples of monovalent, substituted hydrocarbon radicals R are cyanoalkyl radicals such as the β-cyanoethyl radical, haloalkyl radicals such as the 3,3,3-trifluoropropyl radical, and haloaryl radicals such as o-, m- and p-chlorophenyl radicals.

In the process, organopolysiloxanes of the formula (I) which are used are particularly preferably those in which X is a hydroxyl group.

The viscosity of the organopolysiloxanes of the formula (I) is, for example, from 5 mm$^2$/s to 1000 mm$^2$/s, preferably from 10 mm$^2$/s to 250 mm$^2$/s, particularly preferably from 20 mm$^2$/s to 150 mm$^2$/s, in each case at a temperature of 25° C.

Examples of compounds of the formula (I) are α,ω-dihydroxydimethylpolysiloxane having a viscosity of 60 mm$^2$/s at 25° C., α,ω-dihydroxydimethylpolysiloxane having a viscosity of 110 mm$^2$/s at 25° C. and α,ω-bis(trimethylsiloxy)polydimethylsiloxane having a viscosity of 35 mm$^2$/s at 25° C.

Examples of compounds of the formula (II) are hexamethylcyclotrisiloxane, octamethylcyclotetrasiloxane and decamethylcyclopentasiloxane.

Examples of compounds of the formula (III) are hexamethyldisiloxane and 1,3-divinyl-1,1,3,3-tetramethyldisiloxane.

Compounds of the formula (I) in which X is —OSiR$_3$, where R is as defined above, and disiloxanes of the formula (III) are organopolysiloxanes which regulate the chain length. The amount of chain-length-regulating organopolysiloxanes used depends on the desired molecular weight of the organopolysiloxanes prepared by condensation and/or equilibration.

The organopolysiloxanes used in the process can be either one type of above-described organopolysiloxanes or a mixture of various organopolysiloxanes. The organopolysiloxane is preferably a mixture of organopolysiloxanes of the formula (I) in which X is a hydroxyl group, with cyclosiloxanes of the formula (II); or a mixture of organopolysiloxanes of the formula (I) in which X is the group —OSiR$_3$ and R is as defined above, with disiloxane of the formula (III).

The above statements concerning the meanings of R and X also apply fully to the SiC-bonded organic radicals or the Si-bonded radicals of the other organopolysiloxanes.

It is also possible to use further customary auxiliaries such as solvents, filter aids and additives. In the subject process, organopolysiloxanes, finely divided catalyst and, if desired, auxiliaries, can be introduced separately from one another into the reactor used. However, preference is given to introducing a pumpable mixture of organopolysiloxanes, catalyst and, if desired, additives, into the reactor used. This pumpable mixture is preferably prepared by mixing the starting materials with one another in a vessel, if appropriate with heating.

The average particle size of the catalyst used in a heterogeneous suspension is preferably from 0.5 to 1000 μm, in particular from 2 to 200 μm. To carry out the process for altering the viscosity of organopolysiloxanes in a fixed bed, the catalyst can be converted into granule or piece form by known methods. The fixed-bed process can be carried out in known apparatuses suitable for this purpose.

The process for altering the viscosity of organopolysiloxanes can be carried out at customary temperatures, pressures and in the customary times as in the previously known processes for preparing organopolysiloxanes using clay catalysts. The temperatures are preferably from 50 to 200° C., in particular at least 60° C., particularly preferably at least 80° C. and in particular not more than 180° C., particularly preferably not more than 160° C.

The pressures employed are preferably from 0.1 to 10,000 hPa, in particular at least 1 hPa, particularly preferably at least 10 hPa and in particular not more than 5000 hPa, particularly preferably not more than 1100 hPa. For example, when using nonvolatile starting materials such as linear organopolysiloxanes having terminal hydroxyl groups and/or triorganosilyl groups, it is advantageous to carry out the process at low pressures, e.g. from 0.1 to 100 hPa, at which volatile constituents such as water can be effectively removed. On the other hand, when using large amounts of volatile starting materials such as cyclic siloxanes of disiloxanes, it is advantageous to carry out the process at the pressure of the surrounding atmosphere, i.e. from about 900 to 1100 hPa.

In the process, organopolysiloxanes having a viscosity of preferably from 1 to 100,000 mm$^2$/s, in particular at least 5 mm$^2$/s and in particular not more than 50,000 mm$^2$/s, at 25° C. are prepared. Typically, low-viscosity organopolysiloxanes are converted into more highly viscous organopolysiloxanes, in particular oils. The process is also very well suited to preparing low-viscosity organopolysiloxanes from more highly viscous organopolysiloxanes, for example for obtaining low-viscosity, easy-to-purify oils from contaminated, used organopolysiloxanes.

In the examples described below, all parts, percentages and ppm are, unless indicated otherwise, by weight. Unless indicated otherwise, the following examples are carried out at the pressure of the surrounding atmosphere, i.e. at about 1000 hPa, and at room temperature, i.e. at about 23° C., or at the temperature which is established on combining the reactants at room temperature without additional heating or cooling. The viscosities reported are based on a temperature of 25° C.

EXAMPLES C1–C9

Catalyst Preparation

About 100 g of Tonsil® acid-activated clay (Süd-Chemie AG, Munich) of the grade indicated are heated at the temperature indicated for about 2 hours in air. The clays have been treated beforehand with the acids shown below.

| Example | Tonsil ® Clay Grade | Acid | Temperature (° C.) | Dried Sulfur Contents (mg/kg) |
|---|---|---|---|---|
| C1[1] | Optimum 210 FF | HCl | 110 | 220 |
| C2 | Optimum 210 FF | HCl | 250 | — |
| C3 | Optimum 210 FF | HCl | 400 | — |
| C4 | Optimum 210 FF | HCl | 550 | 95 |
| C5 | Optimum 210 FF | HCl | 1100 | 65 |
| C6[1] | L 80 S | HCl | 110 | — |
| C7 | L 80 S | HCl | 550 | — |
| C8[1] | KSF/O | $H_2SO_4$ | 110 | — |
| C9 | KSF/O | $H_2SO_4$ | 550 | — |

[1]Catalyst pretreatment not according to the invention

EXAMPLES

Condensation/Equilibration Employing Catalysts C1–C9

200 g of polydimethylsiloxane, OH-terminated (70 mm$^2$/s at 25° C.), 8 g of hexamethyldisiloxane, and 6 g of catalyst are weighed into a 500 ml three-neck flask fitted with stirrer and heated to about 100° C. with stirring, and held at 100° C. for 15 minutes. The water of reaction formed is subsequently taken off at a pressure of about 15 hPa over a period of 15 minutes. The catalyst is then removed by filtration and the siloxane mixture is freed of volatile constituents (predominantly cyclic molecules) at about 120° C./<1 hPa/ 15 minutes. The oils obtained have normal viscosities of about 100 mm$^2$/s and, in terms of its physical and chemical properties, are typical polydimethylsiloxanes having (CH$_3$)$_3$Si end groups.

| Ex. | Catalyst | Filtration time (sec) | Proportion of cyclic molecules (%) | Si—OH content (ppm by area) | Viscosity after heating (mm$^2$/s) |
|---|---|---|---|---|---|
| 1[1] | C1 | 300 | 15.3 | <30 | 104 |
| 2 | C2 | — | 9.9 | <30 | 95 |
| 3 | C3 | — | 5.8 | <30 | 99 |
| 4 | C4 | — | 2.7 | <30 | 104 |
| 5 | C5 | 140 | 2.8 | <30 | 109 |
| 6[1] | C6 | 1200 | 15.8 | <30 | 107 |
| 7 | C7 | 900 | 6.3 | <30 | 98 |
| 8[1] | C8 | — | 16.1 | <30 | 106 |
| 9 | C9 | — | 4.9 | 48 | 138 |

[1]Comparative examples not according to the invention

What is claimed is:

1. In a process for altering the viscosity of organopolysiloxanes by contacting the organopolysiloxanes with a viscosity-altering catalyst, the improvement comprising selecting as a catalyst, clay which has been treated with mineral acid and subsequently heated to from 250° C. to 1200° C.

2. The process as claimed in claim 1, wherein the heating of the clay is carried out in the presence of oxygen.

3. The process as claimed in claim 1, wherein the mineral acid is hydrochloric acid or sulfuric acid.

4. The process as claimed in claim 2, wherein the mineral acid is hydrochloric acid or sulfuric acid.

5. The process as claimed in claim 1, wherein the clay has been heated to at least 350° C.

6. The process as claimed in claim 2, wherein the clay has been heated to at least 350° C.

7. The process as claimed in claim 3, wherein the clay has been heated to at least 350° C.

8. The process as claimed in claim 1, wherein the clay is present in an amount of from about 0.01 to about 15% by weight based on the weight of the organopolysiloxanes used.

9. The process as claimed in claim 2, wherein the clay is present in an amount of from about 0.01 to about 15% by weight based on the weight of the organopolysiloxanes used.

10. The process as claimed in claim 3, wherein the clay is present in an amount of from about 0.01 to about 15% by weight based on the weight of the organopolysiloxanes used.

11. The process as claimed in claim 5, wherein the clay is present in an amount of from about 0.01 to about 15% by weight based on the weight of the organopolysiloxanes used.

12. The process as claimed in claim 1, wherein the temperature employed during the contacting of the organopolysiloxanes with the catalyst is from 50 to 200° C.

13. The process as claimed in claim 1, wherein organopolysiloxanes having a viscosity of from 1 to 100,000 mm$^2$/s are prepared.

14. The process as claimed in claim 1, wherein organopolysiloxanes having a content of volatile cyclic siloxanes of less than 10% by weight are prepared.

15. In a process for altering the viscosity of organopolysiloxane(s) by contacting the organopolysiloxane(s) with a viscosity altering catalyst, the improvement comprising selecting as the catalyst a mineral acid-treated clay which has been heated to a temperature of 350° C. or more for a period of ten minutes or more in the presence of an oxygen-containing gas.

* * * * *